United States Patent [19]

Kartheiser

[11] Patent Number: 4,868,054
[45] Date of Patent: Sep. 19, 1989

[54] POLY (VINYL CHLORIDE) POLYAMIDE MULTI-LAYER STRUCTURES

[75] Inventor: Peter J. Kartheiser, Long Valley, N.J.

[73] Assignee: Allied-Signal Inc., Morris Township, Morris County, N.J.

[21] Appl. No.: 177,235

[22] Filed: Apr. 4, 1988

[51] Int. Cl.⁴ .................. B32B 27/08; B32B 27/34; C09J 7/02
[52] U.S. Cl. ................... 428/383; 428/355; 428/475.8; 428/476.9; 428/518
[58] Field of Search ............. 428/518, 475.8, 355, 428/476.9, 474.4, 383

[56] References Cited

U.S. PATENT DOCUMENTS

| | | |
|---|---|---|
| 3,576,940 | 5/1971 | Stone et al. |
| 4,171,404 | 10/1979 | Carroll ............ 428/476.9 |
| 4,292,463 | 9/1981 | Bow et al. |
| 4,327,248 | 4/1982 | Campbell |
| 4,348,496 | 9/1982 | Puhe et al. ............ 428/475.8 |
| 4,510,348 | 4/1985 | Arrovo et al. |
| 4,626,619 | 12/1986 | Uematsu |

FOREIGN PATENT DOCUMENTS

| | | |
|---|---|---|
| 1669973 | 2/1986 | Fed. Rep. of Germany |
| 59-146105 | 10/1984 | Japan |
| 62-41039 | 4/1987 | Japan |
| 6917475 | 5/1971 | Netherlands |
| 1257810 | 12/1971 | United Kingdom |

Primary Examiner—George F. Lesmes
Assistant Examiner—D. R. Zirker
Attorney, Agent, or Firm—Melanie L. Brown; Roger H. Criss

[57] ABSTRACT

The present invention provides a multi-layer structure having improved adhesion between its layers. The multi-layer structure has in the following order: a layer of PVC, a layer of adhesive resin, and a layer of polyamide. The adhesive resin comprises organic solvent, vinyl resin, phthalate plasticizer, and leveling agent. The vinyl resin is selected from the group consisting of vinyl chloride-vinyl acetate-vinyl alcohol terpolymer (VAGH), vinyl chloride-vinyl acetate copolymer (VYHH), and vinyl chloride-vinyl acetate-maleic acid terpolymer (VMCM). Electrical conductors formed from a wire conductor and the multi-layer structure have superior adhesion between layers even after the polyamide layer absorbs moisture.

18 Claims, 1 Drawing Sheet

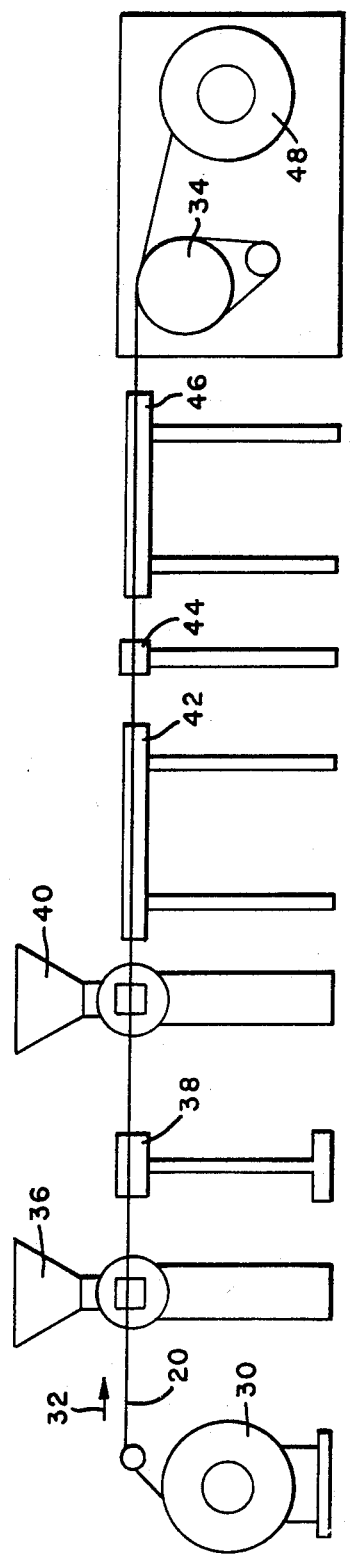

POLY (VINYL CHLORIDE) POLYAMIDE MULTI-LAYER STRUCTURES

BACKGROUND OF THE INVENTION

1. Field of the Invention

The present invention relates to improved poly(vinyl chloride)/polyamide multi-layer structures.

2. Description of the Prior Art

Electrical conductors typically consist of a wire conductor which is surrounded by a multi-layer structure. For example, see U.S. Pat. Nos. 3,576,940; 3,860,686; 4,079,191; 4,292,463; 4,327,248; 4,419,538; 4,472,597; 4,510,348; 4,626,619; and 4,691,082. Electrical conductors having a multi-layer structure of an inner layer of poly(vinyl chloride) (hereinafter PVC) and an outer layer of polyamide are taught in Japanese Patent 59146105, British Pat. No. 1257810, and Dutch Patent 6917475.

Although electrical conductors having an outer layer of polyamide perform well, a problem exists if the electrical conductor is stored outside and exposed to rain and high humidity. Upon contact with water, the polyamide layer tends to absorb moisture and expand considerably. This expansion causes the polyamide layer to swell away from the PVC layer and wrinkle. When the electrical conductor is then fed through a conduit, the wrinkled polyamide layer tears and is unacceptable for use in its intended purpose.

It would be desirable to have a multi-layer structure where good adhesion exists between the PVC layer and the polyamide layer. Multi-layer structures having a PVC layer, an adhesive layer, and a polyamide layer are known. Japanese Patent 62041039 teaches an adhesive layer comprising an acid-modified olefinic polymer and an acid-modified halogen-containing olefinic polymer. German Patent 1669973 teaches an adhesive layer having: (1) a primer layer comprising a mixture of epoxide compounds, hardener, and solvent, and (2) an epoxy adhesive layer.

It would be desirable to have a multi-layer structure, and more specifically, an electrical conductor where good adhesion exists, especially after the polyamide layer absorbs moisture, between the PVC layer and the polyamide layer.

SUMMARY OF THE INVENTION

The present invention provides a multi-layer structure having improved adhesion between its layers. The multi-layer structure has in the following order: a layer of PVC; a layer of adhesive resin wherein the layer comprises vinyl resin, phthalate plasticizer, and leveling agent; and a layer of polyamide. The vinyl resin is selected from the group consisting of vinyl chloride-vinyl acetate-vinyl alcohol terpolymer (VAGH), vinyl chloride-vinyl acetate copolymer (VYHH), and vinyl chloride-vinyl acetate-maleic acid terpolymer (VMCM).

The present invention also provides an electrical conductor comprising in the following order: a wire conductor; a layer of PVC; a layer of adhesive resin wherein the layer comprises: (a) vinyl resin selected from the foregoing group, (b) phthalate plasticizer, and (c) leveling agent; and a layer of polyamide.

It has been found that the foregoing adhesive resin provides superior adhesion between the PVC and polyamide layers. When the present electrical conductor was soaked in water so that the polyamide layer absorbed water, the bond between the PVC and polyamide layers did not weaken. As such, the present invention fulfills the need in the art for a multi-layer structure, and more specifically, an electrical conductor where good adhesion exists between the PVC layer and the polyamide layer even after the polyamide layer absorbs moisture.

Other advantages of the present invention will become apparent from the following description, attached drawings, and appended claims.

BRIEF DESCRIPTION OF THE DRAWINGS

FIG. 1 is an enlarged side view of a multi-layer structure in accordance with the present invention.

FIG. 2 is a cross-sectional view of an electrical conductor in accordance with the present invention.

FIG. 3 is an isometric exploded view of the electrical conductor of FIG. 2.

FIG. 4 is a schematic view of a manufacturing line useful for producing the electrical conductor of FIG. 2.

DETAILED DESCRIPTION OF THE PREFERRED EMBODIMENTS

Referring to FIG. 1, multi-layer structure 10 has a PVC layer 12, an adhesive resin layer 14, and a polyamide layer 16. PVC is commercially available and is typically produced from the addition polymerization of vinyl chloride monomer. For the PVC layer, any suitable PVC polymer can be used. Depending upon the end use, PVC can be purchased to have particular physical properties, an ultimate use temperature rating, flame retardancy, or color.

In one embodiment, the PVC layer 12 may be in the form of a film or sheet or may be co-extruded with the other layers. Although dependent upon the particular intended application, typically the PVC layer 12 has a thickness of about 0.25 to 2.30 mm (about 0.010 to 0.090 inches). The relative thicknesses of the layers of FIGS. 1-3 are for illustrative purposes only and are not so limiting.

The adhesive resin used for layer 14 generally contains an organic solvent, a vinyl resin, a phthalate plasticizer, and a leveling agent. Generally, the adhesive resin has, based on the weight of the adhesive resin, about 75% to 95% organic solvent, about 5% to 20% vinyl resin, up to about 1% phthalate plasticizer, and up to about 1% leveling agent. Typically, the adhesive resin has, based on the weight of the adhesive resin, about 82 to 92% organic solvent, about 7 to 17% vinyl resin, about 0.25 to 1% phthalate plasticizer, and about 0.25 to 1% leveling agent. Preferably, the adhesive resin has, based on the weight of the adhesive resin, about 85 to 89% organic solvent, about 9 to 13% vinyl resin, about 0.25 to 1% phthalate plasticizer, and about 0.25 to 1% leveling agent.

Examples of useful organic solvents include ketones such as cyclohexanone, acetone, and isophorone. Preferably, the organic solvent is cyclohexanone.

Examples of useful vinyl resins include vinyl chloride-vinyl acetate-vinyl alcohol terpolymer (VAGH), vinyl chloride-vinyl acetate copolymer (VYHH), and vinyl chloride-vinyl acetate-maleic acid terpolymer (VMCM). Preferably, the vinyl resin is vinyl chloride-vinyl acetate-vinyl alcohol terpolymer.

Examples of useful phthalate plasticizers include di-2-ethylhexyl phthalate (DOP); diisodecyl phthalate (DIDP); diundecyl phthalate (DUP); and ditridecyl phthalate (DTDP). Such phthalate plasticizers are commercially available. Preferably, the phthalate plasticizer used is di-2-ethylhexyl phthalate (DOP).

The purpose of the leveling or wetting agent is to wet the vinyl resin. Conventional leveling agents may be useful in the present invention. Examples of leveling agents include fluorinated polysilane, silicas, and ethoxylated fatty acids such as polyoxyethylene laurate and polyoxyethylene stearate. The preferred leveling agent is fluorinated polysilane.

Typically, the adhesive resin is applied to the PVC layer 12 while the PVC layer 12 is at a temperature which exceeds the solvent flash point. For example, the flash point of the preferred cyclohexanone solvent is 46° C. and as such when using cyclohexanone, the temperature of the PVC layer 12 would exceed 46° C. Thus, upon the application of the adhesive to the hot PVC layer 12, the organic solvent in the adhesive resin immediately flashes off. If the adhesive resin is co-extruded with the PVC, the PVC is probably at a temperature which exceeds the solvent flash point; but if the PVC is in film or sheet form, the PVC may not be at a temperature which exceeds the solvent flash point so that heat would have to be applied to drive off the solvent. Thus, in the finished product, the layer 14 comprises vinyl resin, phthalate plasticizer, and leveling agent although a trace of organic solvent may be present.

Although dependent upon the particular intended application, typically, the adhesive resin layer 14 may be applied to a thickness of about 0.001 to 0.025 mm (about 0.00004 to 0.001 inches). Preferably, the adhesive resin layer 14 is applied to a thickness of about 0.0025 to 0.013 mm (about 0.0001 to 0.0005 inches).

Still referring to FIG. 1, polyamides suitable for polyamide layer 16 include well-known polyamides which are long chained polymeric structures having recurring amide groups as part of their polymer backbone. Preferably, the polyamides have a relative viscosity of from about 40 to about 250 measured in 90% formic acid at a concentration of 9.2 weight percent.

Non-limiting examples of such polyamides are:

(a) those prepared by the polymerization of lactams, and preferably epsilon-caprolactam (nylon 6);

(b) those prepared by the condensation of a diamine with a dibasic acid, and preferably the condensation of hexamethylene diamine with adipic acid (nylon 6,6); the condensation of hexamethylene diamine with sebacic acid (nylon 6,10),; the condensation of tetramethylenediamine with adipic acid (nylon 4,6),; and the condensation of hexamethylene diamine with azelaic acid (nylon 6,9);

(c) those prepared by self-condensation of amino acids, and preferably self-condensation of 11-aminoundecanoic acid (nylon 11) and self-condensation of 12-aminododecanoic acid (nylon 12); and (d) those based on polymerized vegetable oil acids, or random, block, or graft interpolymers consisting of two or more of these polyamides, or polyamide blends. Preferred polyamides are polyepsiloncaprolactam (nylon 6), polyhexamethylene adipamide (nylon 6,6), and a copolymer of polyepsiloncaprolactam and polyhexamethylene adipamide (nylon 6,6/6). The most preferred polyamide is polyepsiloncaprolactam.

Amorphous polyamides such as prepared with a diacid and meta-or para-xylene diamine; 4,4'-methylenedianiline; 1,3-or 1,4-phenylenediamine; or 2,4- or 2,6-diaminotoluene are also useful.

It is further noted that the aforementioned polyamides containing various terminal functionalities are also suitable for use in the present invention. Preferred polyamides are polycaprolactams (nylon 6) which include (a) a carboxylic group attached to one end and an acetamide group attached to the other end of the polymer chain, (b) an amino group attached to both ends of the polymer chain, (c) a carboxyl group attached to one end and an amino group attached to the other end of the polymer chain, and (d) a carboxyl group attached to both ends of the polymer chain. Particularly preferred is (c) above, a polycaprolactam having a carboxyl group attached to one end and an amino group attached to the other end of the polymer chain.

The polyamide layer 16 is applied to the adhesive resin layer 14. The polyamide layer may be in the form of a film or sheet or may be co-extruded with the other layers. If the polyamide is in the form of a film, the polyamide film would simply be applied to the adhesive resin layer. Otherwise, the PVC, adhesive resin, and polyamide resin may be sequentially extruded. Although dependent upon the particular intended application, typically, the polyamide layer 16 may have a thickness of about 0.05 to 0.40 mm (about 0.002 to 0.016 inches).

The multi-layer structure 10 of FIG. 1 can be used in any application where a mult-layer structure is required. In general, the multi-layer structure is useful as an insulation or protective jacket. More specifically, the multi-layer structure may be useful in housing optics fibers. In certain applications, the multi-layer structure 10 is in tubular form and is ideal for use in protecting a wire conductor 20 as shown in FIGS. 2 and 3.

FIG. 4 illustrates a schematic view of one manufacturing line useful for forming the electrical conductor 18 of FIGS. 2 and 3. The wire conductor 20 may be formed from any suitable metal including copper, aluminum, copper-coated tin, silver-plated copper, and stainless steel. The wire conductor 20 may be in any suitable size such as 1000000 cm (circular mil) to 20 American Wire Gauge (AWG). The wire conductor 20 may be a single solid metal conductor or a plurality of metallic conductors.

As illustrated in FIG. 4, wire conductor 20 is payed off supply package 30 and pulled in the direction of arrow 32 down the manufacturing line by capstan 34. Although PVC may be applied to wire conductor 20 by any known means, PVC can advantageously be extruded onto wire conductor 20 by a first extruder 36 as illustrated in FIG. 4. Typically, the PVC is extruded onto wire conductor 20 at a temperature of about 150° to 200° C. to a thickness of about 0.25 to 2.30 mm (about 0.010 to 0.090 inches). Preferably, the PVC is extruded to a thickness of about 0.33 to 1.90 mm (about 0.013 to 0.075 inches).

Adhesive resin is then applied to the outer surface of the PVC-coated wire conductor by any known means including coating and wiping. Preferably, the aforementioned preferred adhesive resin components and percentages thereof discussed for the multi-layer structure 10 are used for the electrical conductor 18. Adhesive resin can advantageously be extruded onto the PVC-coated wire conductor by adhesive applicator 38 as illustrated in FIG. 4. Typically, the adhesive resin is applied at a substrate temperature which is greater than the solvent flash point and to a thickness of about 0.001 to 0.025 mm (about 0.00004 to 0.001 inches). Preferably, the adhesive resin is applied to a thickness of about 0.0025 to 0.013 mm (about 0.0001 to 0.0005 inches). Thus, the final layer 14 comprises vinyl resin, phthalate plasticizer, and leveling agent although a trace of organic solvent may be present. After application of the adhesive resin, the adhesive resin layer 14 remains tacky so as to provide superior bonding between the PVC layer 12 and the subsequently formed polyamide layer 16.

Polyamide resin is then applied to the outer surface of the adhesive resin-coated PVC-coated wire conductor by any known means. Preferably, the aforementioned preferred polyamides discussed for the multi-layer structure 10 are used for the electrical conductor 18. As illustrated in FIG. 4, polyamide resin can advantageously be extruded onto the adhesive resin-coated PVC-coated wire conductor by a second extruder 40 so as to complete the electrical conductor 18 as illustrated in FIGS. 2 and 3. The polyamide is extruded at a temperature of about 230° to 300° C. to a thickness of about 0.05 to 0.40 mm (about 0.002 to 0.016 inches). Preferably, the polyamide is applied to a thickness of about 0.09 to 0.30 mm (about 0.0035 to 0.0120 inches). Electrical conductor 18 may then be pulled through a first quench tank 42, receive an identification mark at print station 44, be pulled through a second quench tank 46, and be taken up on a tension-controlled package 48.

As shown in FIGS. 2-3, the completed electrical conductor 18 comprises wire conductor 20, PVC layer 12, adhesive resin layer 14, and polyamide layer 16.

An electrical conductor comprising in the following order: a copper wire conductor, a layer of PVC, and a layer of nylon 6 was made. When this electrical conductor was soaked in water, the nylon 6 layer swelled and separated from the PVC layer. When the electrical conductor was then subjected to bending prior to installation into a conduit system, the nylon 6 layer wrinkled which caused voids between the PVC and nylon 6 layers. When the electrical conductor was then installed in a conduit system, the nylon 6 jacket tore easily which was unacceptable.

An electrical conductor, of the present invention, comprising in the following order: a copper wire conductor; a layer of PVC; a layer of adhesive resin wherein the layer comprised vinyl chloride-vinyl acetate-vinyl alcohol terpolymer, di-2-ethylhexyl phthalate, and fluorinated polysilane; and nylon 6 was made. When the electrical conductor was soaked in water for 20 hours at room temperature so that nylon 6 layer 16 absorbed water in an amount of 9.5% to become totally saturated, the bond between the PVC layer 12 and the nylon 6 layer 16 did not weaken. When the electrical conductor 18 was bent to a three inch radius, the nylon 6 layer 16 remained wrinkle- and void-free.

Although the electrical conductor 18 is particularly useful in conduit systems, the electrical conductor 18 is also useful in tray or ladder systems. The electrical conductor 18 may also be twisted in multiples to form a cable which may or may not have a jacket of thermoplastic or thermoset material surrounding it.

Thus, the present invention provides a multi-layer structure and an electrical conductor where good adhesion exists between the PVC and polyamide layers.

Having described the invention in detail and by reference to preferred embodiments thereof, it will be apparent that modifications and variations are possible without departing from the scope of the invention defined in the appended claims.

What is claimed is:

1. A multi-layer structure having improved adhesion between its layers comprising in the following order:
   a layer of poly(vinyl chloride);
   a layer of adhesive resin wherein said layer comprises:
   (a) vinyl resin wherein said vinyl resin is a vinyl resin selected from the group consisting of vinyl chloride-vinyl acetate-vinyl alcohol terpolymer; vinyl chloride-vinyl acetate copolymer; and vinyl chloride-vinyl acetate-maleic acid terpolymer,
   (b) phthalate plasticizer, and
   (c) leveling agent; and
   a layer of polyamide wherein said polyamide is a polyamide selected from the group consisting of nylon 6; nylon 6,6; and nylon 6,6/6.

2. The multi-layer structure of claim 1 wherein said polyamide is nylon 6.

3. The multi-layer structure of claim 1 wherein said layer of adhesive resin is formed from an adhesive resin which comprises:
   (a) about 75 to 95% organic solvent,
   (b) about 5 to 20% vinyl resin,
   (c) up to about 1% phthalate plasticizer, and
   (d) up to about 1% leveling agent.

4. The multi-layer structure of claim 1 wherein said layer of adhesive resin is formed from an adhesive resin which comprises:
   (a) about 82 to 92% organic solvent,
   (b) about 7 to 17% vinyl resin,
   (c) about 0.25 to 1% phthalate plasticizer, and
   (d) about 0.25 to 1% leveling agent.

5. The multi-layer structure of claim 1 wherein said layer of adhesive resin is formed from an adhesive resin which comprises:
   (a) about 85 to 89% organic solvent,
   (b) about 9 to 13% vinyl resin,
   (c) about 0.25 to 1% phthalate plasticizer; and
   (d) about 0.25 to 1% leveling agent.

6. The multi-layer structure of claim 1 wherein said multi-layer structure is in tubular form.

7. An electrical conductor comprising a wire conductor surrounded by the multi-layer structure of claim 6.

8. The multi-layer structure of claim 1 wherein said vinyl resin is vinyl chloride-vinyl acetate-vinyl alcohol terpolymer.

9. The multi-layer structure of claim 1 wherein said phthalate plasticizer is di-2-ethylhexyl phthalate.

10. The multi-layer structure of claim 1 wherein said leveling agent is fluorinated polysilane.

11. An electrical conductor comprising in the following order:
    a wire conductor;
    a layer of poly(vinyl chloride);
    a layer of adhesive resin wherein said layer comprises:
    (a) vinyl resin wherein said vinyl resin is a vinyl resin selected from the group consisting of vinyl chloride-vinyl acetate-vinyl alcohol terpolymer; vinyl chloride-vinyl acetate copolymer; and vinyl chloride-vinyl acetate-maleic acid terpolymer,
    (b) phthalate plasticizer, and
    (c) leveling agent; and
    a layer of polyamide wherein said polyamide is a polyamide selected from the group consisting of nylon 6; nylon 6,6; and nylon 6,6/6.

12. The electrical conductor of claim 11 wherein said polyamide is nylon 6.

13. The electrical conductor of claim 11 wherein said layer of adhesive resin is formed from an adhesive resin which comprises:

(a) about 75 to 95% organic solvent,
(b) about 5 to 20% resin,
(c) up to about 1% phthalate plasticizer, and
(d) up to about 1% leveling agent.

14. The electrical conductor of claim 11 wherein said layer of adhesive resin is formed from an adhesive resin which comprises:
(a) about 82 to 92% organic solvent,
(b) about 7 to 17% vinyl resin,
(c) about 0.25 to 1% phthalate plasticizer, and
(d) about 0.25 to 1% leveling agent.

15. The electrical conductor of claim 11 wherein said layer of adhesive resin is formed from an adhesive resin which comprises:
(a) about 85 to 89% organic solvent.
(b) about 9 to 13% vinyl resin,
(c) about 0.25 to 1% phthalate plasticizer, and
(d) about 0.25 to 1% leveling agent.

16. The electrical conductor of claim 11 wherein said vinyl resin is vinyl chloride-vinyl acetate-vinyl alcohol terpolymer.

17. The electrical conductor of claim 11 wherein said phthalate plasticizer is di-2-ethylhexyl phthalate.

18. The electrical conductor of claim 11 wherein said leveling agent is fluorinated polysilane.

* * * * *